Patented Feb. 12, 1946

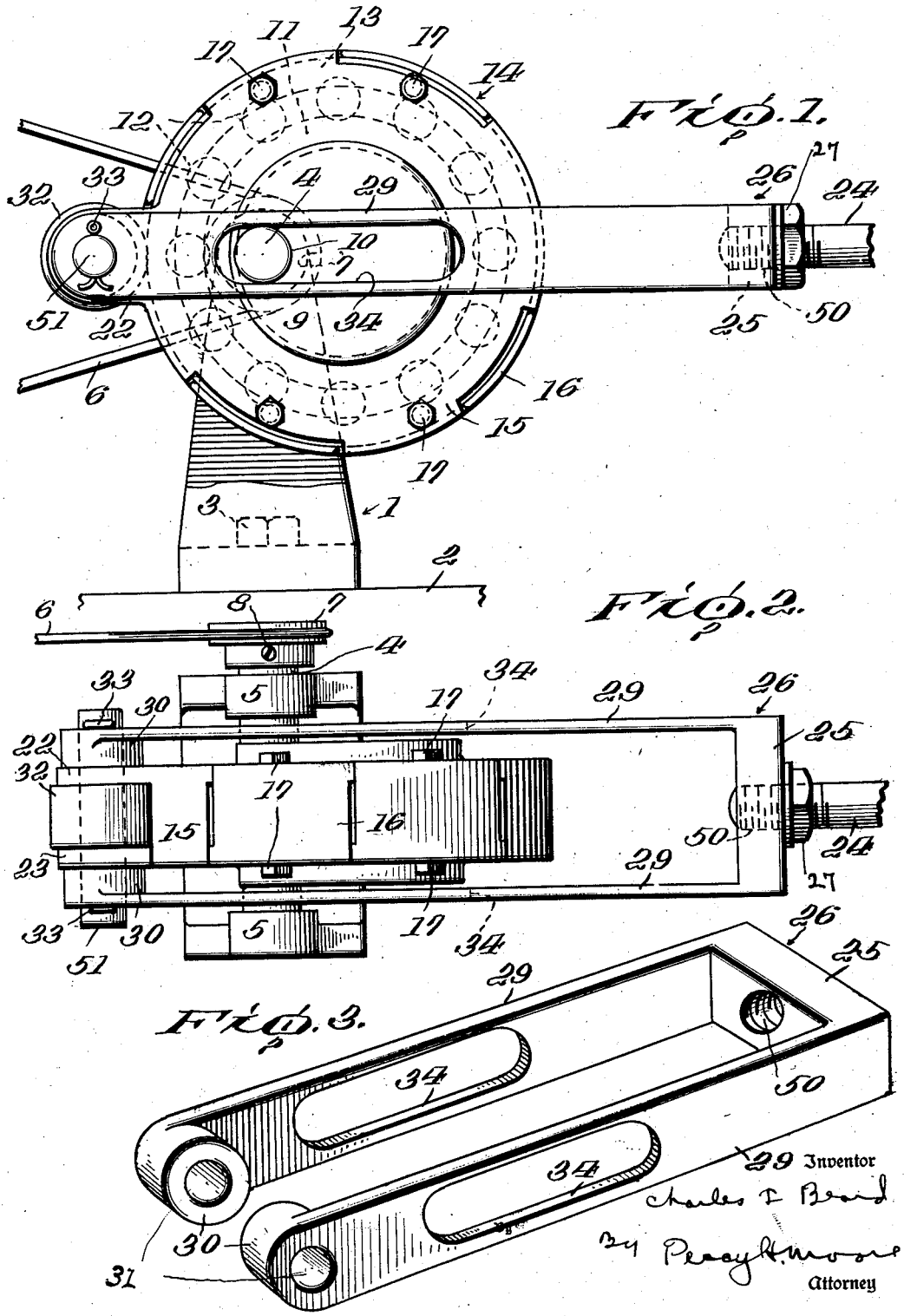

2,394,741

UNITED STATES PATENT OFFICE 2,394,741

ECCENTRIC DRIVING CONNECTION

Charles L. Beard, Lancaster, Pa.

Application November 30, 1944, Serial No. 565,970

2 Claims. (Cl. 74—50)

My invention relates to eccentric driving connections adapted to convert the rotative movement of a drive shaft into the reciprocatory movement of a pump piston, or other part, which the user desires to actuate.

An object of the invention is to provide an economical and efficient drive assembly composed of relatively few working parts, easy to manufacture and assemble, and which operates with a minimum of friction.

Other objects and advantages will be apparent from the following description, reference being had to the accompanying drawing, wherein a preferred form as well as a modified form of embodiment of the present invention are shown.

In the drawing:

Figure 1 is a side elevation of the invention;

Figure 2 is a top plan view thereof; and

Figure 3 is a perspective view of the yoke connection between the eccentric and driven shaft.

Referring more particularly to Figures 1, 2 and 3 of the drawing numeral 1 denotes a bracket or other suitable support adapted to be secured to a floor, wall or the like 2, by means of bolts 3, only one of which is shown. A drive shaft 4 is rotatably mounted in bearings 5, formed on the support 1, and this shaft is rotated by a V-belt 6, which passes over a grooved collar 7, fixed to the shaft 4, as at 8, and is operatively connected to a motor not shown. An eccentric 9 is keyed to the shaft 4, for rotation therewith, an opening 10 in the eccentric 9, disposed at one side of the center thereof being provided for receiving the shaft.

An annular ball race 11 surrounds and is fixed to the disk or eccentric 9 and a plurality of balls 12 are disposed between this ball race 11 and a second or outer ball race 13, secured to a casing 14. The casing 14 comprising two interfitting flanged circular members 15 and 16 are connected together and to the outer ball race 13 by bolts 17 and are respectively formed with rearwardly projecting apertured ears 22 and 23 for a purpose presently described.

Rotative movement of the drive shaft 4 is converted into reciprocatory movement by means of a connecting rod 24 suitably connected at its outer end to a pump piston or any other member, not shown, which the user desires to reciprocate. The inner threaded end of the rod 24 extends through an opening 50, formed in the body portion 25, of a substantially U-shaped coupling member 26, and is secured thereto by lock nut 27. The member 26 includes two parallel spaced arms or bifurcations 29 projecting rearwardly from and at right angles to the body portion 25. These arms terminate at their free ends in apertured bosses 30, the apertures 31 of which are adapted to receive the ends of a pin 51, which pin also passes through the apertured ears 22 and 23 of the casing 14 and an apertured disk 32, clamped between the apertured ears, cotter pins 33 being employed to hold the various parts securely together. The arms 29 are spaced sufficiently to freely receive the casing 14 therebetween and are formed with elongated longitudinally extending oppositely disposed slots 34, through which the shaft 4 freely extends.

It will be apparent that when the shaft 4 is rotated the eccentric 9 and the inner ball race 11 will be rotated with respect to the outer race 13, and about the shaft as a fixed pivot, and that the connecting rod 24 will be reciprocated in a horizontal plane thus causing the piston or other part pivotally connected to the outer end of the rod 24 to be reciprocated. The pivotal connection between the coupling member 25 and the disk 32 permits of very slight relative movement of the shaft 4 with respect to the walls of the slots 34, as the rod 24 is reciprocated.

It is obvious that the bracket 1 can be so mounted that the connecting rod 24 will be reciprocated in any desired plane.

Having thus described my invention:

What I claim is:

1. An eccentric attachment of the character described comprising a shaft, an eccentric mounted upon the shaft and comprising a circular disk having an opening at one side of the center thereof for receiving the said shaft, the latter being keyed in the said opening to impart rotary motion to the disk when the shaft is rotated, inner and outer spaced races, said inner race embracing and fixed to said eccentric, a casing comprising interfitting circular members connected together and to the outer race, said casing members formed with rearwardly projecting ears, an apertured disk positioned between said ears, a coupling member having rearwardly extending spaced arms formed with opposed openings at their rear ends, a pin passing through said opposed openings in the arms and through the apertures in said ears and the apertures in said disk to pivotally connect these parts together, said arms being slidably connected to said shaft, a connecting rod and means for securing said connecting rod to the forward end of said coupling member.

2. An eccentric attachment according to claim 1 in which the arms of the coupling member are slotted to slidably receive the shaft.

CHARLES L. BEARD.